(12) United States Patent
Takei

(10) Patent No.: US 6,468,450 B1
(45) Date of Patent: Oct. 22, 2002

(54) METHOD FOR FORMING ROTATABLE ARMREST WITH ROTATION DEVICE

(75) Inventor: Yoshiyuki Takei, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/986,093

(22) Filed: Nov. 7, 2001

(51) Int. Cl.$^7$ .......................... B29C 44/06; B29C 44/12
(52) U.S. Cl. .................. 264/46.6; 264/46.7; 264/275; 264/278
(58) Field of Search .................. 264/46.6, 46.7, 264/275, 278

(56) References Cited

U.S. PATENT DOCUMENTS

| | | | | |
|---|---|---|---|---|
| 4,948,541 A | * | 8/1990 | Beck | 264/46.7 |
| 5,190,707 A | * | 3/1993 | Yanagishita | 264/46.6 |
| 5,275,779 A | * | 1/1994 | Marfilius et al. | 264/46.6 |
| 5,611,977 A | * | 3/1997 | Takei | 264/46.5 |
| 5,730,917 A | * | 3/1998 | Ishikawa et al. | 264/46.5 |

FOREIGN PATENT DOCUMENTS

| | | |
|---|---|---|
| JP | 2000-238568 | 9/2000 |
| JP | 2001-61595 | 3/2001 |

* cited by examiner

Primary Examiner—Allan R. Kuhns
(74) Attorney, Agent, or Firm—Browdy and Neimark, P.L.L.C.

(57) ABSTRACT

A method for forming an armrest of rotatable type with rotation device, which method utilizes: a hinged foaming die device comprising a stationary die and a movable die hingedly connected with the stationary die; a core die piece; and a location pin. An incomplete armrest unit, which comprises a three-dimensional trim cover assembly and a rotation device, is placed in the stationary die, such that the rotation device is positively retained by the core die piece and location pin to the stationary die. Then, after engaging the movable die with the stationary die, a liquid foaming material is injected into the inside of the trim cover assembly and cured into a foam padding filled therein, whereby a resulting armrest of rotatable type with the rotation device is obtained in a predetermined configuration.

8 Claims, 3 Drawing Sheets

METHOD FOR FORMING ROTATABLE ARMREST WITH ROTATION DEVICE

BACKGROUND OF INVENTION

1. Field of the Invention

The present invention generally relates to a method for forming an armrest of the type rotatably attached to a lateral side of a seat back of an automotive seat. In particular, the invention is directed to a method involving a foaming step, which is suited for forming an armrest of this type provided with a rotation device for allowing the armrest to be rotatable vertically and laterally at the seat back.

2. Description of Prior Art

Among armrests for use with an automotive seat, known is a rotatable type of armrest which is rotatably attached to a lateral side of a seat back of the seat, so that the armrest can be rotated between a horizontally extending use position and an upright non-use position. In the horizontally extending use position, the armrest extends horizontally from the seat back to support a passenger's arm, and in the upright non-use position, the armrest is stored upright on and along the vertical side wall of the seat back. Also, as disclosed from the Japanese Patent Laid-Open Publication No. 2001-61595 for instance, there is such a type of armrest that is provided with a rotation device for allowing the armrest body to be rotatable in vertical and lateral directions. In this prior art, the armrest body is of a known armrest configuration having a cut-out corner area in which a rotatable part of the rotation device is exposed, and that particular rotatable part is connected with a lateral wall of a backrest or seat back of automotive seat. The rotatable part of rotation device comprises a connecting bracket pivotally connected with the seat back lateral wall and a rotatable shaft unit rotatably connected with an armrest frame provided in the armrest body. Thus, the armrest body may not only be rotated vertically via the connecting bracket, but also be rotated laterally (i.e. in either leftwards or rightwards) via the rotatable shaft unit, with respect to the seat back (see FIG. 7 for instance).

In forming this particular sort of armrest, the armrest frame and a part of the rotation device are first placed in a preformed three-dimensional trim cover assembly to provide an initially assembled armrest. Then, such initially assembled armrest is set in a foaming die device, followed by injecting a liquid foaming material in the interior of the trim cover assembly. The liquid foaming material is cured and expanded in the trim cover assembly, so that a foam padding is created and filled therein together integrally with the armrest frame and rotation device, excepting the above-stated connecting bracket. Normally, the foaming die device used is of a hinged type wherein a movable upper die is pivotally connected via a hinge to a lower stationary die. Thus, an operator flips over the upper die from the lower die via the hinge to open the two dies in order that he or she will place the initially assembled armrest in the dies before foaming operation. Also, after the foaming operation, the operator flips over the upper die from the lower die via the hinge to take out the foamed resultant armrest therefrom.

However, in the foregoing type of armrest, the rotatable part of rotation device is formed from a hard metallic material and projects outwardly from the armrest body. This projected hard part of armrest has been found defective in interfering with the foregoing hingedly opening and closing of the upper die with respect to the lower die, which makes it entirely difficult or impossible to place and take out an armrest unit from the two dies. Furthermore, that rotatable part of rotation device is free to rotate in all angles and therefore can not be precisely located and retained at a given position within the dies.

SUMMARY OF THE INVENTION

In view of the above-stated drawbacks, it is therefore a primary purpose of the present invention to provide an improved method which makes it easy to form a rotatable armrest with rotation device under optimal conditions, using a hinged foaming die device.

To achieve such purpose, in accordance with the present invention, there is basically provided a method comprising the steps of;

providing an incomplete armrest unit pre-assembled by: a trim cover assembly of three-dimensional configuration formed in a shape conforming to an outer shape of armrest; and a rotation means attached to the trim cover assembly;

providing a hinged foaming die means comprising a stationary die and a movable die rotatably connected via a hinge means with the stationary die;

providing a core die means to be accommodated between the stationary and movable dies so as to cover and retain the rotation means of the incomplete armrest unit therebetween;

providing a location pin adapted to locate and retain the rotation means at a predetermined point in the stationary die;

placing the incomplete armrest unit in the stationary die;

retaining the rotation means of the incomplete armrest unit at the predetermined point in the stationary die by means of the location pin;

setting the core die means on the stationary die so as to cover and support the rotation means of incomplete armrest unit;

causing the movable die to rotate about the hinge means toward said stationary die, thereby closing both movable and stationary dies;

then, injecting a liquid foaming material into inside of the trim cover assembly; and subjecting the incomplete armrest unit to foaming by curing the liquid foaming material into a foam padding filled in the trim cover assembly, whereby the armrest of rotatable type with the rotation means is formed.

Accordingly, due to the combination of the core die piece and location pin, the rotation means, which is prone to undesired movement and rotation, can be easily and precisely located at a given point within stationary and movable dies and retained therein against any movement and rotation. Hence, a resultant armrest can be easily formed in a predetermined shape, and also, it is easy to open the movable die from the stationary die to take out the resultant armrest therefrom.

Preferably, the core die piece may have a curved upper surface, whereas the movable die may have, formed therein, a curved recessed area having a curvature substantially equal to a curvature of the curved upper surface of core die piece, whereby the movable die is rotatable relative to the hinge means, without interference with the core die piece, in a direction toward and away from the stationary die.

Other features and advantages of the present invention will become apparent from reading of the description hereinafter, with reference to the annexed drawings.

DETAILED DESCRIPTION OF PREFERRED EMBODIMENT OF THE PRESENT INVENTION

Figure 1:
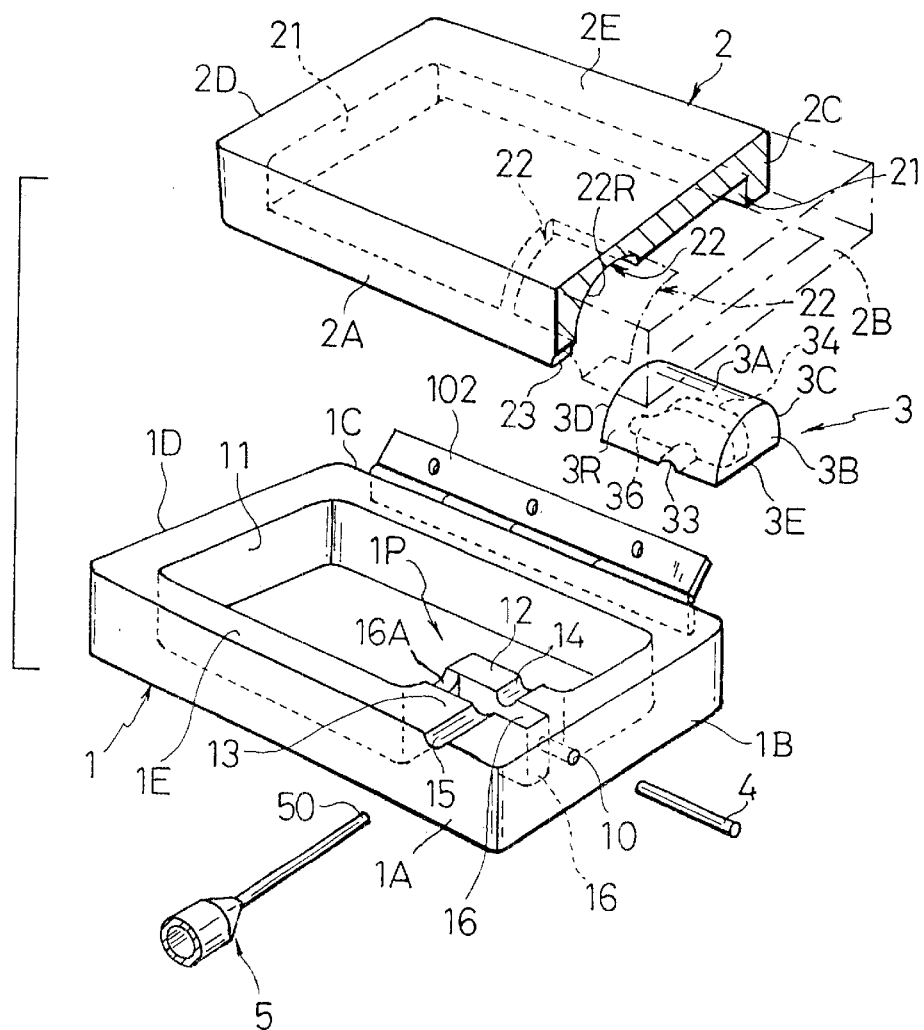
FIG. 1 is a partly broken, exploded perspective view of a hinged foaming die device used in the method of the present invention.
Figure 2:
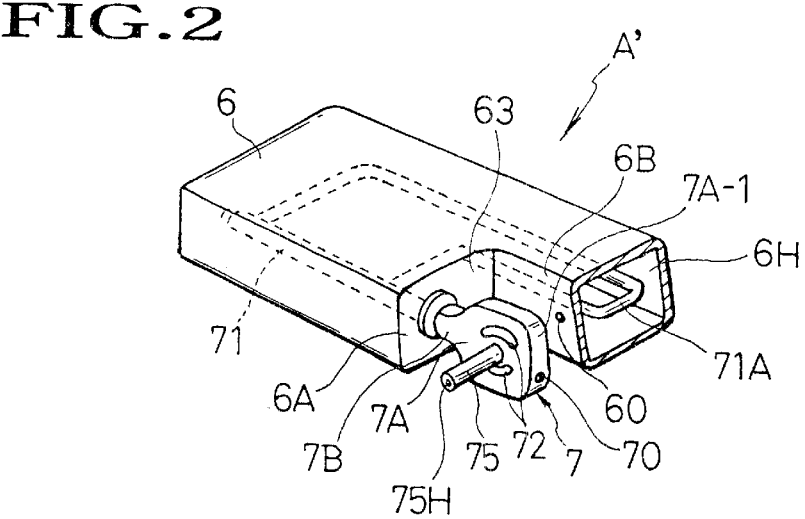
FIG. 2 is a partly broken perspective view of an incomplete armrest unit.
Figure 6:
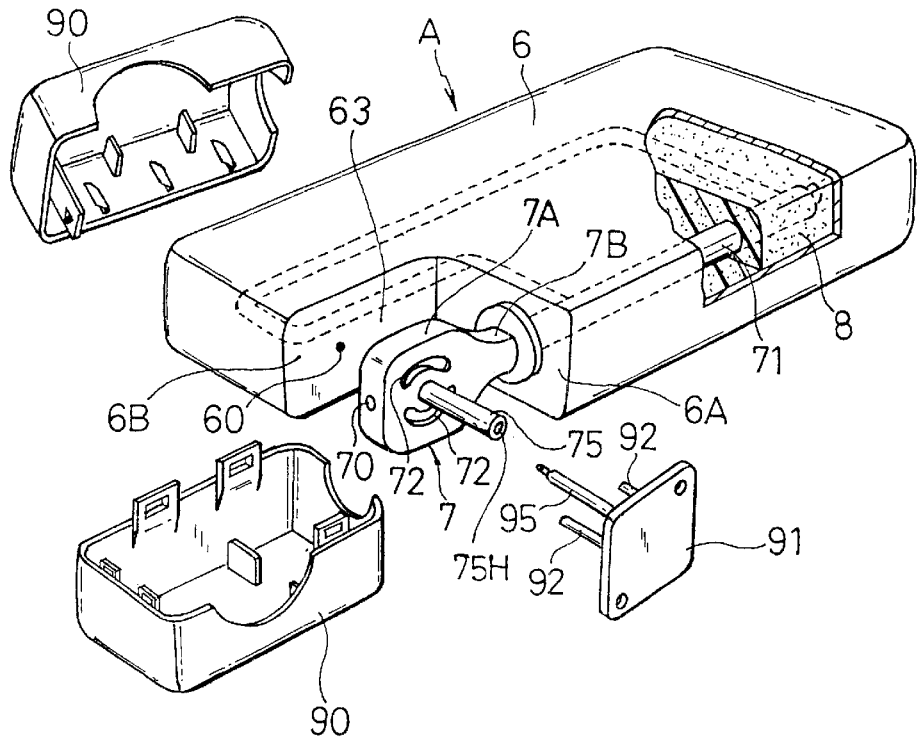
FIG. 6 is a partly broken, exploded schematic perspective view of a resulting rotatable armrest with rotation device which has been formed by the method of the present invention.
Figure 7:
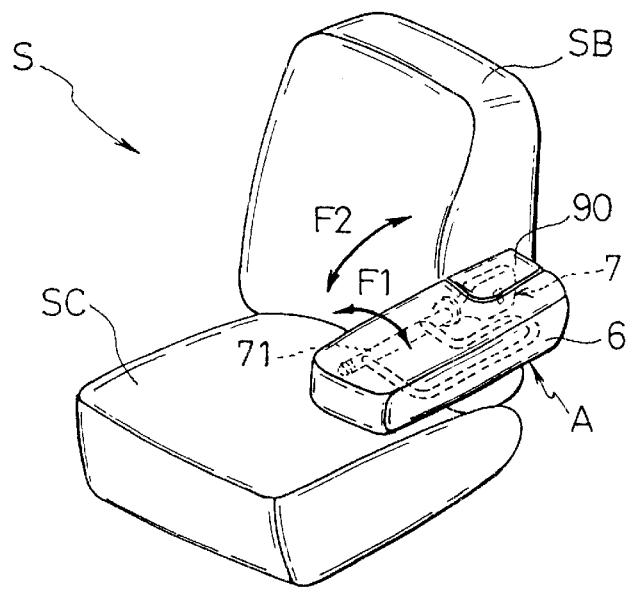
FIG. 7 is a schematic perspective view of a vehicle seat to which the resulting rotatable armrest is mounted.

FIG. 1 shows an exemplary mode of hinged foaming die device (D) used in a method of the present invention for forming a rotatable armrest with a rotation device. As shown in FIGS. 2 and 6, a resulting (foamed) rotatable armrest to be produced in the present invention is generally designated by (A), which is of the illustrated configuration having a cut-out corner area (63) and provided with a rotation/connection device (7) situated in that cut-out corner area (63). This rotatable armrest is known from the previously described Japanese Laid-Open Patent Publication No. 2001-61595. FIG. 2 shows an incomplete headrest unit (A') to be processed later by a foaming process using the hinged foaming die device (D) into a resultant foamed complete headrest (A) shown in FIG. 6. At first, a brief description will be made of the basic construction of this sort of rotatable armrest with reference to the FIG. 2. The armrest described herein is of the vertically and laterally rotatable type, as stated earlier, wherein, as shown in FIG. 7, the armrest body per se is rotatable in the vertical direction (F2) and lateral (leftward and rightward) directions (F1). Specifically, again referring to FIG. 2, designation (6) denotes a three-dimensional trim cover assembly having a predetermined armrest configuration with a cut-out corner area (63) defined by a first vertical cover wall region (6A) and a second vertical cover wall region (6B). The first cover wall region (6A) extends transversely of the trim cover assembly (6) while the second cover wall region (6B) extends longitudinally of the same (6), thereby defining an elbow-like angled recession or that particular cut-out corner area (63). In the interior (6H) of the thus-formed armrest trim cover assembly (6), an armrest frame (71, 71A) is placed. The armrest frame is provided with a rotation/connection device (7). The device (7) comprises a main bracket body (7A) and a narrow end portion (7B). The main bracket body (7A) is rotatably connected via the narrow end portion (7B) with a rotary spindle (71) disposed within the trim cover assembly, so that the main bracket body (7A) is free to rotate about the axis of the rotary spindle (71), which means that the armrest body can be rotated about the axis of the spindle (71) in leftward and rightward directions as understandable from the arrow (F1) in FIG. 7. Designation (75) denotes a cylindrical connecting shaft having a through-bore (75H) therein. As shown in FIG. 2, a base end portion of that shaft (75) is firmly secured in the center of the main bracket body (7A), while a free end portion thereof projects horizontally therefrom at a right angle. As can be seen from FIG. 3, such base end portion of the cylindrical connecting shaft (75) penetrates the center of main bracket body (7A) and is secured therein. Designation (60) denotes an injection hole which is so formed in the second cover wall region (6B) as to coaxially align with the base end portion of cylindrical connecting shaft (75) as seen from FIG. 3. Thus, as will be described, the nozzle portion (50) of injection nozzle (5) can be inserted all through the through-bore (75H) of cylindrical connecting shaft (75) and injection hole (60) into the interior of the trim cover assembly (6). Again, this construction of armrest is known from the Japanese Laid-Open Publication No. 2001-61595. But, in accordance with the present invention, a location hole (70) is formed in the forward end wall region (7A-1) of the main bracket body (7A), which will be elaborated later.

As shown in FIG. 1, in accordance with the present invention, the hinged foaming die device (D) is comprised of: a stationary lower die (1); a movable upper die (2) hingedly connected with the lower die (1) via a hinge (102); and a core die piece (3).

The stationary lower die (1) has, formed therein, a recessed main die surface (11) generally conforming to an outer shape of the trim cover assembly (6) and a support block area (1P) so formed to receive and support a lower half of the rotation/connection device (7) therein. As illustrated, the lower die (1) is also formed with a first side wall (1A), a second side wall (1B), a third side wall (1C), a fourth side wall (1D) and an upper rectangular flat peripheral region (1E). The support block area (1P) has a rectangular contour on the whole which generally conforms to the elbow-like angled wall surfaces of cut-out corner area (63) of trim cover assembly (6) (i.e. the first and second vertical wall cover regions (6A) (6B)). Formed longitudinally in that support block area (1P) is a first support recession (16) such as to receive and support a lower half of the main bracket body (7A) of rotation/connection device (7) therein. Further, defined on the opposite sides of recession (16) are a first block portion (12) and a second block portion (13) in the support block area (1P). As shown, the first block portion (12) extends continuous from the second side wall (1B) of lower die (1) in the lengthwise direction of lower die (1), with the top flat surface of the fist block portion (12) extending continuous from the upper flat region (1E) of the lower die (1) on the same plane. On the other hand, the second block portion (13) extends continuous from the first side wall (1A), protruding a certain amount into the recessed main die surface (11). The top flat surface of the second block portion (13) extends continuous from the lower die upper flat region (1E) on the same plane. Designation (16A) denotes an integral support piece which is disposed in one extremity of the first support recession (16), defining a wall between the that recession (16) and the recessed main die surface (11). As shown, the support piece (16A) integrally bridges over both first and second block portions (12) (13), having a concave top surface so configured to fit receive and support a lower half of the narrow end portion (7B) of rotary connecting bracket (7).

Designations (14) and (15) stand for a second support recession and a third support recession, respectively, each being of a semi-circular cross-section. Those second and third support recessions (14) (15) extend outwardly from the opposite sides of the first support recession (16) on the same line, as shown in FIG. 1. That is, the second support recession (14) is so formed in the first block portion (12) as to penetrate the latter in the transverse direction thereof and communicate with the recessed die surface area (11). On the other hand, the third support recession (15) is formed in the second block portion (13), penetrating it as well as the lower die first side wall (1A) in the transverse direction thereof, thus opening outwardly from that particular side wall (1A). The second recession (14) is so formed to receive a lower half of the nozzle portion (50) of injection nozzle (5), and the third recession (15) is so formed to receive a lower half of the cylindrical connecting shat (75). Both second and third support recessions (14) (15) align coaxially with each other across the first recession (16) for the purpose of allowing the long nozzle portion (50) to be inserted all therethrough, as will be described.

Designation (10) denotes a location through-bore which penetrates the lower die side wall (1B) on the horizontal line and communicates with the first support recession (16). Otherwise stated, this through-bore (10) is formed in the side wall (1B) at a predetermined point, such that, when the rotation/connection device (7) is placed in the first recession (16), the location hole (70) formed in that device (7) aligns coaxially with the location through-bore (10) to thereby allow a location pin (4) to be inserted through the through-bore (10) into the location hole (70). Accordingly, the rotation/connection device (7) can be positively located and retained at a given position in the lower die (1).

The core die piece (3) is of the illustrated outer configuration formed with: a top surface (3A); a first side surface (3B); a second side surface (3D); a third side surface (3C); a bottom flat surface (3E); and a curved upper surface (3R) extending curvilinearly downwards from the top surface (3A). It is noted that the whole bottom area at (3E) of this core die piece (3) substantially corresponds to a whole upper area of the foregoing support block area (1P) for the purpose of mating the dies precisely. Further, as can be seen from FIG. 1 and FIGS. 3 to 5, formed in the bottom surface (3E) of core die piece (3) are: a main support recession (34); a first subsidiary support recession (33); a second subsidiary support recession (35); and a third subsidiary support recession (36). The main support recession (34) is configured in a shape generally conforming to an upper half of the main bracket body (7A). Therefore, when placing the core die piece (3) on the support block area (1P), the main support recession (34) of the former matches the first support recession (16) of the latter to define a hollow therebetween in which a whole of the main bracket body (7A) is to be fitted and supportively accommodated. On the other hand, the first and second subsidiary support recessions (33) (35) are both of a rectilinearly extending tunnel shape having a semi-circular cross-section, and they extend outwardly from the opposite sides of the main support recession (34) in a direction opposite to each other. Thus, the first subsidiary support recession (33) opens in the lower end region of the curved upper surface (3R) whereas the second subsidiary support recession (35) opens in the lower end region of the third side surface (3C). Also, the first and second subsidiary support recessions (33) (35) generally conform in shape to an upper half of the cylindrical connecting shaft (75) and an upper half of the nozzle portion (50), respectively. On the other hand, the third subsidiary support recession (36) is also of a rectilinearly extending tunnel shape having a semi-circular cross-section, which extends outwardly from the main support recession (34) and opens in the lower end region of the second side surface (3D). In other words, the third subsidiary support recession (36) extends in a direction orthogonal with a line along which those first and second subsidiary support recessions (33) (35) align coaxially with each other. The shape of this third subsidiary recession (36) generally conforms to an upper half of the narrow end portion (7B) of rotation/connection device (7). Needless to mention, all those three subsidiary support recessions (33), (35) and (36) communicate with the main support recession (34). It is noted that, when the core die piece (3) is set in place on the support block area (1P), the first and second subsidiary support recessions (33) (35) match the third and second support recessions (15) (14), respectively, while the third subsidiary support recessions (36) matches the concave top surface of support piece (16A).

With regard to the upper die (2), it is substantially equal in dimensions to the lower die (1), having the illustrated configuration formed with: a top wall (2E); a first side wall (2A); a second side wall (2B); a third side wall (2C); and a fourth side wall (2D). As can be seen from FIG. 1, the upper die (2) has, formed therein, a recessed main die surface (21) which is substantially in conformity with an outer shape of the trim cover assembly (6). Also, formed in a corner area of such recessed main die surface (21) is a local arcuate recessed area (22) so configured to supportively receive and engage the upper curved surface regions of the core die piece (3). More specifically, the local arcuate recessed area (22) has a curved inner surface to match and engage the top surface (3A) and curved upper surface (3R) of core die piece (3) and also has a depth for fit engaging the upper ends of the three side walls (3B) (3C) (3D) of core die piece (3), as can be seen from FIGS. 1, 3, 4 and 5.

Both lower and upper dies (1) (2) are hingedly connected together via the hinge (102) to constitute the foaming die device (D). In other words, the hinge (102) is at its one end fixedly fastened to the third side wall (1C) of the lower die (1) and at its another end fixedly fastened to the third wall (2C) of the upper die (2), so that the upper die (2) can be rotated about the hinge (102) to engage and disengage the lower die (1).

Now, description will be made of a foaming process to subject the incomplete armrest unit (A') to foaming, using the above-described die device (D).

Figure 3:
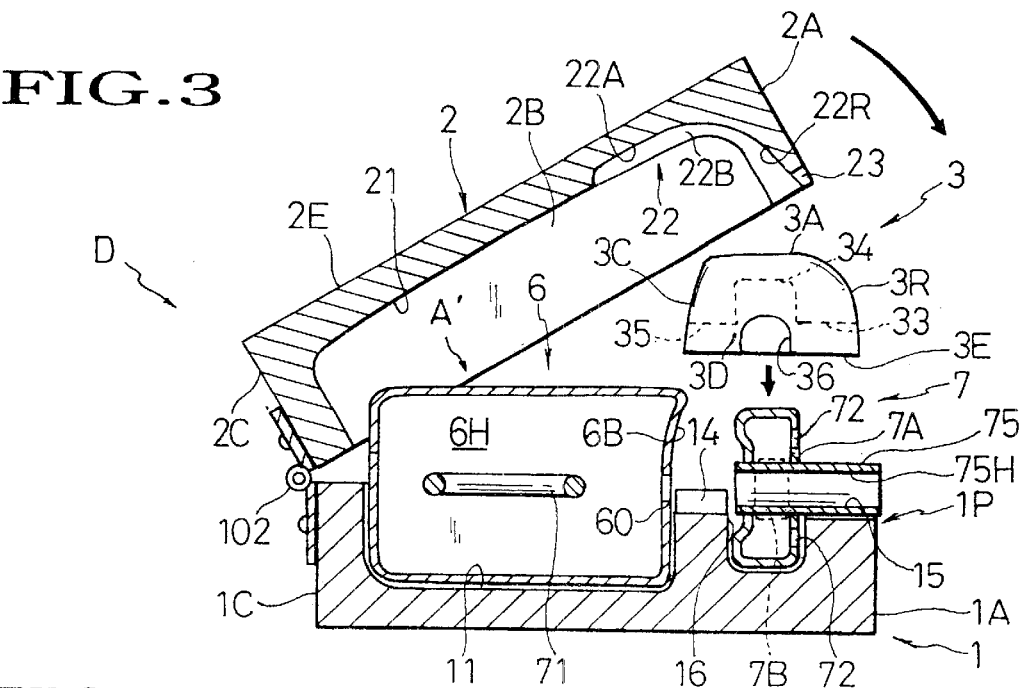
FIG. 3 is a schematic sectional view which explanatorily shows the steps of placing and retaining the incomplete armrest unit in the hinged foaming die device.

At first, as shown in FIG. 3, a lower half of the incomplete armrest unit (A') is placed in the recessed die surface (11) of lower die (1), while simultaneously insuring that a lower half of the main bracket body (7A) of rotation/connection device (7) is set in the first support recession (16), that a lower half of the narrow end portion (7B) of the device (7) is set in the concave top surface of support piece (16A), and that a lower half of the cylindrical connecting shaft (75) is set in the third support recession (15) (see FIG. 3).

It is noted here that the injection hole (60), formed in the second vertical cover region (6B) of trim cover assembly (6), is in alignment with the second recession (14) of support block area (1P), as seen from FIG. 3.

Then, the location pin (4) is inserted through the location through-bore (10) of lower die (1) into the location hole (70) of rotation/connection device (7), whereupon the rotation/connection device (7) is precisely set in position in the support block area (1P) and retained therein against any unnecessary movement and rotation.

Next, the core die piece (3) is mounted upon the support block area (1P) of lower die (1) to supportively cover the upper halves of the rotation/connection device (7) and connecting shaft (75). In other words, the upper half of the main bracket body (7A) is supported in the main support recession (34) of core die piece (3), while the upper half of narrow end portion (7B) and the upper half of connecting shaft (75) are respectively supported in the third and first subsidiary support recessions (36) (33) of core die piece (3). This can be understood from FIGS. 4 and 5. Further, with this mounting of core die piece (3), the second subsidiary support recession (35) associated with that core die piece (3) matches the second support recession (14) of support block area (1P), thereby defining therebetween a through-bore of circular cross-section. This particular through-bore now coaxially aligns with the injection hole (60) of trim cover assembly (6).

Thereafter, the upper die (2) is rotated downwardly as indicated by the arrow in FIG. 1 and brought into a full engagement with the lower die (1). This can be smoothly done due to the arcuate shapes of both local arcuate recessed area (22) of upper die (2) and curved upper surface (3R) of core die piece (3), which effectively allows smooth relative sliding engagement therebetween. For that purpose, preferably, the curvatures of those arcuate recessed area (22) and curved upper surface (3R) may be defined along the circumference of a circle whose center is at the rotation center of the hinge (102) in order to prevent interference of the core die piece (3) with the hingedly opening and closing of the upper die (2) with respect to the lower die (1).

Figure 4:
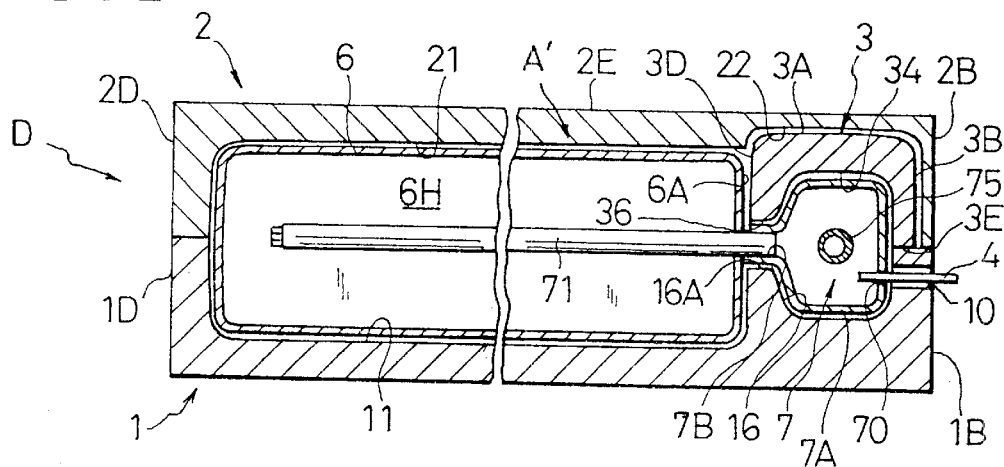
FIG. 4 is a partly broken schematic longitudinal section of the hinged foaming die device, showing the state where the incomplete armrest unit is set in place and retained within the hinged foaming die device.

Accordingly, the local arcuate recessed area (22) fits and engages the top surface (3A) and curved upper surface (3R) of core die piece (3), while the inner vertical walls (22B) of the local recessed area (22) (as seen in FIG. 3) circumscribe and support the upper local end regions of the three side walls (3B) (3C) (3D) of core die piece (3). Hence, a whole of the core die piece (3) is positively retained in that local recessed area (22) with respect to the support block area (1P), which also works in cooperation with the location pin (4) to insure holding the rotation/connection device (7) in place within the lower die (1) against any undesired movement and rotation, as understandable from FIGS. 4 and 5. At the same time, the upper half of the trim cover assembly (6) is situated within the recessed die surface (21) of upper die (2), so that the whole of trim cover assembly (5) is accommodated within both upper and lower dies (2) (1). In that way, a whole of the incomplete armrest unit (A') is stably set and supported in the foaming die device (D), as shown in FIGS. 4 and 5.

Figure 5:
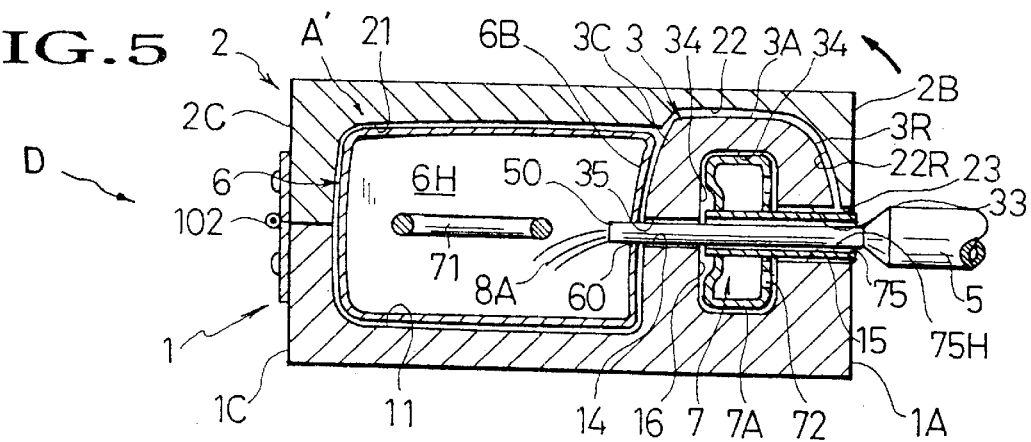
FIG. 5 is a schematic cross-sectional view of the hinged foaming die device, showing the state where an injection nozzle is inserted through the die device and a liquid foaming material is injected via the injection nozzle into the inside of trim cover assembly of the incomplete armrest unit.

Then, as shown in FIG. 5, the long nozzle portion (50) of injection nozzle (5) is inserted through the hole (75H) of cylindrical connecting shaft (75) and the through-bore defined between the second subsidiary support recession (35) and second support recession (14) as well as through the injection hole (60) of trim cover assembly (6), until the forward end of nozzle portion (50) projects inwardly of the trim cover assembly (6). As shown, a liquid foaming material or agent (8A) is injected through the nozzle (5) into the interior (6H) of trim cover assembly (6).

The liquid foaming material (8A) is cured and foamed into a foam padding (8) which fills the whole interior (6H) of trim cover assembly (6), whereupon there is produced a complete armrest body (A) (see FIG. 6). After then, the upper die (2) is rotated upwardly as indicated by the arrow in FIG. 5 away from the lower die (1), and the armrest body (A) is taken out from the lower die (1).

FIG. 6 shows the resulting armrest body (A) with the rotation/connection device (7), which has been formed in the above-described foaming processes. As illustrated, a pair of upper and lower garnish covers (90) (90) are attached around the outwardly exposed device (7) of the armrest (A) such as to fill the cut-out corner area (63) for an improved aesthetic appearance of the armrest. Designation (91) stands for a connecting plate having a bearing shaft (95) and a pair of guide pins (92) (92). The bearing shaft (95) is rotatably secured in the bore (75H) of the cylindrical connecting shaft (75), while the two guide pins (92) (92) are respectively slidably inserted through the two arcuate guide holes (72) (72). Thereafter, the connecting plate (91) is fixedly attached to a lateral wall of the seat back (SB) of a vehicle seat (S), as shown in FIG. 7. This is known from the Japanese Laid-Open Patent Publication No. 2001-61595, not the subject matter of the present invention, and for more information in this regard, reference is made to that publication.

From the description made thus far, in accordance with the present invention, the following effects and advantages are attained:

(i) Due to the combination of core die piece (3) and location pin (4), the rotation/connection device (7), which is prone to undesired movement and rotation, can be easily and precisely located at a predetermined point within upper and lower dies (2) (1) and retained therein against any movement and rotation.

(ii) The upper die (2) includes a local recessed area (22) defined therein, which is to engage and hold the upper end regions of the core die piece (3). Thus, the core die piece (3) itself can be retained by such local recessed area (22), leading thus to more positive retaining of the rotation/connection device (7) in addition to the foregoing combination of core die piece (3) and location pin (4).

Finally, it should be understood that the present invention is not limited to the illustrated embodiment, but any other modifications, replacements and additions may be structurally applied thereto without departing from the scopes of the appended claims.

What is claimed is:

1. A method for forming an armrest of a rotatable type with a rotation means, comprising the steps of:

providing an incomplete armrest unit pre-assembled by: a trim cover assembly of three-dimensional configuration formed in a shape conforming to an outer shape of said armrest; and said rotation means which is attached to said trim cover assembly;

providing a hinged foaming die means comprising a stationary die and a movable die rotatably connected via a hinge means with said stationary die;

providing a core die means to be accommodated between said stationary and movable dies so as to cover and retain said rotation means of the incomplete armrest unit therebetween;

providing a location pin adapted to locate and retain said rotation means at a predetermined point in said stationary die;

placing said incomplete armrest unit in said stationary die;

retaining said rotation means of the incomplete armrest unit at the predetermined point in the stationary die by means of said location pin;

setting said core die means on said stationary die so as to cover and support said rotation means of the incomplete armrest unit;

causing said movable die to rotate about said hinge means toward said stationary die, thereby closing both said movable and stationary dies;

then, injecting a liquid foaming material into the inside of said trim cover assembly; and subjecting said incomplete armrest unit to foaming by curing said liquid foaming material into a foam padding filled in the trim cover assembly, whereby said armrest of a rotatable type with said rotation means is formed.

2. The method as defined in claim 1, wherein said stationary die has, formed therein, a recession to receive and support one part of said rotation means, and wherein said core die piece has, formed therein, a recession to cover and support another part of said rotation means.

3. The method as defined in claim 1, wherein said core die means has a curved upper surface, and wherein said movable die has, formed therein, a curved recessed area having a curvature substantially equal to a curvature of said curved upper surface of the core die means, whereby said movable die is rotatable relative to said hinge means, without interference with said core die means, in a direction toward and away from said stationary die.

4. The method as defined in claim 1, wherein a location hole is formed in said rotation means, wherein a location through-bore is formed in said stationary die, and wherein, at the step of retaining said rotation means, there is further included the step of inserting said location pin via said location through-bore of the stationary die into said location hole of the rotation means, thereby positively retaining the rotation means at the predetermined point in the stationary die.

5. A method for forming an armrest of a rotatable type with a rotation means, comprising the steps of:

providing an incomplete armrest unit pre-assembled by: a trim cover assembly of three-dimensional configuration formed in a shape conforming to an outer shape of said armrest; and said rotation means which is attached to said trim cover assembly, said rotation means comprising: a main body; a first axis portion about which the incomplete armrest unit is rotatable in a first direction; and a second axis portion about which the incomplete armrest unit is rotatable in a second direction, wherein said main body as well as said first and second axis portions project outwardly from the trim cover assembly;

providing a hinged foaming die means comprising a stationary die and a movable die rotatably connected via a hinge means with said stationary die;

providing a core die means to be accommodated between said stationary and movable dies so as to cover and retain said rotation means of the incomplete armrest unit therebetween, said core die means including: a main recession to support said main body therein; a first subsidiary recession to support said first axis portion therein; and a second subsidiary recession to support said second axis portion therein;

providing a location pin adapted to locate and retain said rotation means at a predetermined point in said stationary die;

placing said incomplete armrest unit in said stationary die;

retaining said rotation means of the incomplete armrest unit at the predetermined point in the stationary die by means of said location pin;

setting said core die means on said stationary die, such that said main recession covers and supports said main body of the rotation means therein, said first subsidiary recession covers and supports said first axis portion of the rotation means therein, and said second subsidiary recession covers and supports said second axis portion of the rotation means therein, so as to support and retain the rotation means in said core die means;

causing said movable die to rotate about said hinge means toward said stationary die, thereby closing both said movable and stationary dies;

then, injecting a liquid foaming material into the inside of said trim cover assembly; and subjecting said incomplete armrest unit to foaming by curing said liquid foaming material into a foam padding filled in the trim cover assembly, whereby said armrest of a rotatable type with said rotation means is formed.

6. The method according to claim 5, wherein said trim cover assembly includes a cut-out corner area in which said rotation means is disposed and exposed outwardly, said cut-out corner area being defined by a first vertical cover region extending in a widthwise direction of the trim cover assembly and a second vertical cover region extending in a lengthwise direction of the trim cover assembly, wherein said first axis portion of the rotation means extends from said main body thereof and penetrates said first vertical cover region into the inside of the trim cover assembly, while said second axis portion of the rotation means extends from said main body at generally a right angle in a direction outwardly of the trim cover assembly, wherein said stationary die includes a support block area having, formed therein, a main recession to receive one half of said main body of the rotation means; a support piece to receive one half of said first axis portion of the rotation means, said support piece being integrally formed in said main recession; and a subsidiary recession to receive one half of said second axis portion of the rotation means, said subsidiary recession extending from said main recession at generally a right angle in a direction outwardly of the stationary die, wherein said main recession of said core die means is so formed to cover and support another half of said main body, wherein said first subsidiary recession of the core die means is so formed to cover and support another half of said first axis portion, and wherein said second subsidiary recession of the core die means is so formed to cover and support another half of said second axis portion.

7. The method according to claim 6, wherein a location hole is formed in said main body of said rotation means, wherein a location through-bore is so formed in said stationary die as to communicate with said main recession formed in said support block area, and wherein, at the step of retaining said rotation means, there is further included the step of inserting said location pin via said location through-bore into said location hole of the main body of the rotation means, thereby positively retaining the rotation means at the predetermined point in the stationary die.

8. A method for forming an armrest of a rotatable type with a rotation means, comprising the steps of:

providing an incomplete armrest unit pre-assembled by: a trim cover assembly of three-dimensional configuration formed in a shape conforming to an outer shape of said armrest; and said rotation means which is attached to said trim cover assembly, said rotation means comprising: a main body; a first axis portion about which the incomplete armrest unit is rotatable in a first direction; and a second axis portion about which the incomplete armrest unit is rotatable in a second direction, said second axis portion having a through-bore formed therein, wherein said main body as well as said first and second axis portions project outwardly from the trim cover assembly;

said trim cover assembly having an injection hole formed therein;

providing a hinged foaming die means comprising a stationary die and a movable die rotatably connected via a hinge means with said stationary die;

providing an injection nozzle having a nozzle portion through which a liquid foaming material is to be injected into inside of said trim cover assembly;

providing a core die means to be accommodated between said stationary and movable dies so as to cover and retain said rotation means therebetween, said core die means including: a main recession to support said main body therein; a first subsidiary recession to support said first axis portion therein; a second subsidiary recession to support said second axis portion therein; and a third subsidiary recession to support said nozzle portion of the injection nozzle therein;

providing a location pin adapted to locate and retain said rotation means at a predetermined point in said stationary die;

placing said incomplete armrest unit in said stationary die;

retaining said rotation means of the incomplete armrest unit at the predetermined point in the stationary die by means of said location pin;

setting said core die means on said stationary die, such that said main recession covers and supports said main body of the rotation means therein, said first subsidiary recession covers and supports said first axis portion of the rotation means therein, and a second subsidiary recession covers and supports said second axis portion of the rotation means therein, so as to retain the rotation means in said core die means, while defining a hole between said third subsidiary recession and said stationary die;

causing said movable die to rotate about said hinge means toward said stationary die, thereby closing both said movable and stationary dies;

then, inserting said nozzle portion of the injection nozzle through said through-bore of the second axis portion, said hole defined between said third subsidiary recession and the stationary die, and said injection hole of the trim cover assembly;

injecting a liquid foaming material via said nozzle portion into the inside of the trim cover assembly; and subjecting said incomplete armrest unit to foaming by curing said liquid foaming material into a foam padding filled in the trim cover assembly, whereby said armrest of a rotatable type with said rotation means is formed.

* * * * *